(12) United States Patent
McCormick et al.

(10) Patent No.: US 6,503,475 B1
(45) Date of Patent: Jan. 7, 2003

(54) PROCESS FOR THE PRODUCTION OF ULTRAFINE POWDERS OF METAL OXIDES

(75) Inventors: Paul Gerard McCormick, Nedlands (AU); Takuya Tzuzuki, Kalamunda (AU)

(73) Assignee: Advanced Nano Technologies Pty Ltd., Nedlands (AU)

( * ) Notice: Subject to any disclaimer, the term of this patent is extended or adjusted under 35 U.S.C. 154(b) by 0 days.

(21) Appl. No.: 09/700,124

(22) PCT Filed: May 17, 1999

(86) PCT No.: PCT/AU99/00368

§ 371 (c)(1),
(2), (4) Date: Nov. 13, 2000

(87) PCT Pub. No.: WO99/59754

PCT Pub. Date: Nov. 25, 1999

(30) Foreign Application Priority Data

May 15, 1998 (AU) ................................................ PP3557

(51) Int. Cl.$^7$ ........................ C01G 23/00; C01G 25/00; C01F 17/00; C01F 11/00; C01F 7/00
(52) U.S. Cl. ........................ 423/592; 423/593; 423/598; 423/608; 423/609; 423/610; 423/625; 423/637; 423/263
(58) Field of Search .................................. 423/592, 263, 423/625, 637, 609, 610, 598, 608, 593

(56) References Cited

U.S. PATENT DOCUMENTS

| 5,443,811 A | * | 8/1995 | Karvinen |
| 5,927,621 A | * | 7/1999 | Ziolo et al. |
| 6,203,768 B1 | * | 3/2001 | Mccormick et al. |

FOREIGN PATENT DOCUMENTS

| DE | 35 05 024 A1 | | 8/1986 |
| EP | 0 734 765 A1 | | 10/1996 |
| WO | 97/07917 | * | 3/1997 |

* cited by examiner

Primary Examiner—Steven Bos
(74) Attorney, Agent, or Firm—Michael Best & Friedrich LLP

(57) ABSTRACT

A process for the production of ultrafine powders that includes subjecting a mixture of precursor metal compound and a non-reactant diluent phase to mechanical milling whereby the process of mechanical activation reduces the microstructure of the mixture to the form of nano-sized grains of the metal compound uniformly dispersed in the diluent phase. The process also includes heat treating the mixture of nano-sized grains of the metal compound uniformly dispersed in the diluent phase to convert the nano-sized grains of the metal compound into a metal oxide phase. The process further includes removing the diluent phase such that the nano-sized grains of the metal oxide phase are left behind in the form of an ultrafine powder.

16 Claims, 2 Drawing Sheets

PROCESS FOR THE PRODUCTION OF ULTRAFINE POWDERS OF METAL OXIDES

FIELD OF THE INVENTION

The present invention relates to a process for the production of ultrafine powders and relates particularly, though not exclusively, to the production of ultrafine powders consisting of individual particles with sizes in the range of 1 nm to 200 nm.

BACKGROUND TO THE INVENTION

Ultrafine powders have significant potential for a wide range of applications including catalysts, magnetic recording media, optoelectronic materials, magnetic fluids and composite materials. Ultrafine metallic powders have been prepared by physical methods, such as vapour deposition and sputtering, which have high quality, i.e. clean surfaces and uniform particle size distribution. However, industrial applications for such powders are limited by low yield rates and high cost. Alternative chemical production methods, such as thermal decomposition and precipitation are currently being studied for the preparation of a wide range of powders. Chemical methods can provide large quantities of ceramic powders for industrial applications. However, except for precious metals, chemical methods are generally not applied to the production of metallic powders.

Mechanical activation has been used for the production of fine powders with particle sizes typically in the range of 0.2 to 2 microns. One method for the production of powders by mechanical activation is the process of mechanical alloying described in U.S. Pat. No. 3,591,362, by which alloys are formed from pure starting materials by milling a mixture of the powders in a high energy ball mill. During milling the constituent particles undergo repeated collisions with the grinding balls causing deformation, welding and fracture of the particles which result in microstructural refinement and composition changes leading to the formation of nanocrystalline or amorphous alloys.

Another example of the use of mechanical activation to form fine powders, as described in U.S. Pat. No. 5,328,501, is concerned with a mechanochemical reduction process. This process involves the mechanically activated chemical reduction of reducible metal compounds with a reductant during milling in a high energy ball mill, to refine and manufacture metals, alloys and composite powders. During milling the energy imparted to the reactants through ball/reactant collision events causes repeated welding and fracture of the reactant particles. Consequently oxidation/reduction reactions occur at welded interfaces and reaction kinetics are enhanced without the need for high temperatures or melting to increase intrinsic reaction rates.

A method for the manufacture of ultrafine powders with particle sizes less than 50 nm is described in International Application No. PCT/AU96/00539. This process involves a mechanically activated chemical reaction between a metal compound and a suitable reagent which occurs either during mechanical milling or during subsequent heat treatment of the milled powder. During mechanical activation a composite structure is formed which consists of nano-sized grains of the nano-phase substance within the matrix of the by-product phase. Removal of the by-product phase yields nano particles of the desired material.

The above described prior art techniques require the occurrence of a mechanically activated chemical reaction between the starting powders to form nano-sized particles. Mechanical milling processes, which do not involve the occurrence of chemical reactions between the major constituents have not previously been known to result in powders containing a significant fraction of particles with sizes less than 50 nm. For example, ultrafine grinding processes such as attrition milling are known to be effective in producing powders with mean particle sizes down to about 500 nm. However, the achievement of smaller particle sizes generally requires long milling times and significant energy inputs and is therefore limited by economic considerations. Contamination of the product may also be a problem. In addition it is widely accepted that the existence of a so-called 'limiting particle size' limits the practical minimum particle size that can be attained by grinding to values greater than 100 nm, irrespective of the type of ball mill employed.

SUMMARY OF THE INVENTION

The present invention is concerned with a new process for the manufacture of ultrafine powders which is based on the mechanical milling of two or more nonreacting powders. The process of the invention is based on the discovery that mechanical milling of multi-phase systems can be used to provide an improved, lower cost process for the production of ultrafine powders.

Throughout this specification the term "comprising" is used inclusively, in the sense that there may be other features and/or steps included in the invention not expressly defined or comprehended in the features or the steps specifically defined or described. What such other features and/or steps may include will be apparent from the specification read as a whole.

According to one aspect of the present invention there is provided a process for the production of ultrafine powders, the process comprising:

subjecting a mixture of a suitable precursor metal compound and a non-reactant diluent phase to mechanical milling which through the process of mechanical activation reduces the microstructure of the mixture to the form of nano-sized grains of the metal compound uniformly dispersed in the diluent phase;

heat treating the milled powder to convert the nano-sized grains of the metal compound into a desired metal oxide phase; and, removing the diluent phase such that said nano-sized grains of the metal oxide phase are left behind in the form of an ultrafine powder.

According to another aspect of the present invention there is provided a process for the production of ultrafine powders, the process comprising:

providing a suitable precursor metal compound heat treated to convert the metal compound into a desired metal oxide phase;

subjecting a mixture of the metal oxide phase and a non-reactant diluent phase to mechanical milling which through the process of mechanical activation reduces the microstructure of the mixture to the form of nano-sized grains of the desired metal oxide phase uniformly dispersed in the diluent phase; and, removing the diluent phase such that said nano-sized grains of the desired metal oxide phase are left behind in the form of an ultrafine powder.

The term "ultrafine powder" as used above and throughout the remainder of the specification refers to individual dispersed nano-sized particles in powder form and includes powder particles in the size range of 1nm to 200 nm, or more typically in the size range 10 nm to 100 nm.

In a preferred form of the invention, mechanical milling and activation is performed inside a mechanical mill, for example, a ball mill. Mechanical activation occurs in a ball mill when grinding media, typically steel or ceramic balls, are kept in a state of continuous relative motion with a feed material by the application of mechanical energy, such that the energy imparted to the feed material during ball-feed-ball and ball-feed-liner collisions is sufficient to cause mechanical activation.

Throughout the remainder of the specification reference will be made to mechanical activation being carried out inside a ball mill. Examples of this type of mill are attritor mills, nutating mills, tower mills, planetary mills, vibratory mills and gravity-dependent-type ball mills.

It will be appreciated that the mechanical activation may also be achieved by any suitable means other than ball milling. For example, mechanical activation may also be achieved using jet mills, rod mills, roller mills or crusher mills.

During mechanical activation the ball-powder collision events cause the powder particles to be deformed and fractured. Cold-welding of overlapping particles occurs between surfaces formed by prior fracture. The competing processes of deformation, fracture and welding continue during milling, and result in microstructural refinement. While the changes in microstructure that occur during mechanical activation depend on the mechanical properties of the constituent powders, a nanoscale microstructure is generally developed provided sufficient milling has been carried out. The mechanical activation of a mixture of powders having relatively low hardnesses causes the development of a composite layered structure in the early stages of milling. Each ball/powder collision event can be thought of as a micro-forging, flattening the particles into layers which fracture on reaching sufficiently high strains. Welding and coalescence characteristics should depend on the relative hardness of the respective powders. With further milling, the particle microstructure is refined into a nano-composite structure consisting of a mixture of 1–20 nm sized grains of the two starting phases. Mechanical milling can also cause disordering and amorphization of the respective powder phases. Ductility of the constituent powders is not necessarily a requirement for a nanoscale mixture to form.

Following mechanical activation the milled powder is heat treated to thermally decompose the metal compound into the oxide phase, evolving a gas such as $H_2O$, $CO_2$, and $SO_3$. During the thermal decomposition step no reaction occurs between the metal compound and diluent phases. To achieve minimum particle sizes the thermal decomposition temperature is preferably sufficiently low to prevent the occurrence of grain growth of the metal oxide phase.

The step of removing the diluent phase may involve subjecting the nanocomposite structure to a suitable solvent which selectively removes the diluent phase, while not reacting with the metal oxide phase.

In one form of the process of the invention the metal compound is a hydroxide, carbonate, sulphate, oxychloride or other compound which decomposes on heating in air to form an oxide of the metal and the diluent is a salt which does not react with the metal compound and which is readily dissolved in a solvent.

Typically the precursor metal compound is selected from the group consisting of cerium hydroxide, $Ce(OH)_4$, zirconium oxychloride, $ZrOCl_2$, cerium carbonate, $Ce_2(CO_3)_3$, zinc carbonate basic, $ZnCO_3 \cdot 2Zn(OH)_2$, tin chloride, $SnCl_2$, aluminium sulphate, $Al_2(SO_4)_3$, titanyl sulphate, $TiOSO_4$, aluminium hydroxide, $Al(OH)_3$, barium carbonate, $BaCO_3$, and titanium dioxide, $TiO_2$.

The choice of the metal compound and diluent phases is typically based on the following considerations:

(1) mechanical properties which facilitate the formation of the nanoscale structure during milling.

A low hardness of the metal compound phase is desirable to ensure deformation and fracture of the particles during milling, so that a nanocomposite microstructure consisting of isolated grains of the metal compound phase embedded in the diluent phase is developed during milling. Preferably the Mohs hardness of the metal compound phase falls within the range 1 to 5. If the hardness of the metal compound phase is too high, as is generally the case with ceramic oxide particles, the forces generated during ball/powder collision events may be insufficient to cause deformation and fracture of the phase and, therefore, refinement of the microstructure may not occur during milling. To optimise the welding together of the phases and formation of a composite nano-structure the two phases being milled should have similar mechanical properties.

(2) low abrasivity.

Low abrasivity is desirable to minimise contamination of the product powder by the grinding balls and mill container.

(3) the precursor metal compound should be converted to the oxide by heating to relatively low temperatures.

The conversion of the metal compound being milled to the desired phase should occur at temperatures sufficiently low that significant coarsing of the particles does not occur to achieve minimum particle size.

(4) the precursor metal compound should preferably be one which is used in conventional processing of the product material.

Metal compounds used as precursors or formed at intermediate stages in conventional separation and purification processes will generally be of lower cost relative to alternative starting materials and therefore, provide the basis of a lower cost process. Such metal compounds include aluminium sulphate, $Al_2(SO_4)_3$, or aluminium hydroxide, $Al(OH)_3$, for the manufacture of high purity alumina, cerium carbonate, $Ce_2(CO_3)_3$, or cerium hydroxide, $Ce(OH)_4$, for the manufacture of cerium oxide, and zirconium oxychloride ($ZrOCl_2$) for the manufacture of zirconia. Other possible metal compounds include zinc carbonate basic, $ZnCO_3 \cdot 2Zn(OH)_2$, tin chloride, $SnCl_2$, titanyl sulphate, $TiOSO_4$, barium carbonate, $BaCO_3$, and titanium dioxide, $TiO_2$. With some metal compounds it may be desirable to remove any chemically attached water prior to milling.

(5) the diluent phase should have a low tendency to agglomerate during milling, particularly in the presence of small amounts of water.

(6) the diluent phase should not react with the metal compound or its oxide during any stage of the process.

(7) the diluent phase should exhibit a high solubility in common solvents such as water or alcohol to facilitate its removal.

The diluent phase should be added in a sufficient amount relative to the metal compound phase so that the volume fraction of the diluent is high enough for the nano-sized grains of the metal compound to develop during milling as fully separated grains embedded in the diluent phase. Typically the volume fraction of the diluent phase should exceed 80% to ensure fully separated nano-size grains. A suitable diluent phase may be selected from the group consisting of NaCl, $CaCl_2$, $MgCl_2$, $Na_2SO_4$, $Na_2CO_3$, $Ca(OH)_2$, CaO and MgO.

In another form of the invention the metal compound may be an oxide phase which has the requisite milling properties to form nanograins when milled with a diluent.

In another form of the invention two or more metal compounds, or a mixture of a metal compound and a metal oxide may be milled with a diluent phase to form a nanocomposite structure consisting of separated nanoparticles of the metal compound phases embedded in the diluent phase. During heat treatment the metal compound phases may react with one another to form nanoparticles of the desired phase within the inert diluent phase.

BRIEF DESCRIPTION OF THE DRAWINGS

The invention is further described in and illustrated by the following examples, which are not to be construed as limiting the invention in any way, to be read in conjunction with the accompanying drawings, in which.

DETAILED DESCRIPTION OF PREFERRED EMBODIMENTS

EXAMPLE 1

Synthesis of Ultrafine $CeO_2$ Particles from $Ce(OH)_4$

Figure 1:
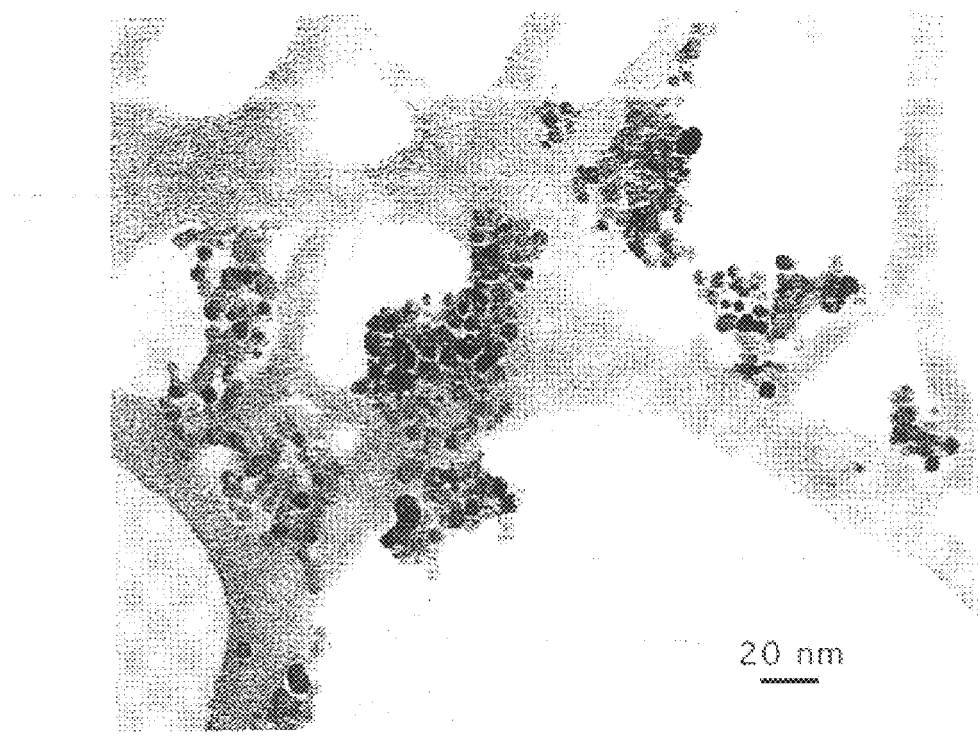
FIG. 1 is TEM micrograph of $CeO_2$ nano particles in a sample milled for 6 hours and calcined at 500° C.

The materials used were $Ce(OH)_4$ (97%, −100 mesh) and NaCl (>99.5%, ≦500 μm). The starting mixture of $Ce(OH)_4$ and NaCl powder containing 28.4 wt % $Ce(OH)_4$, corresponding to $Ce(OH)_4$+9 NaCl, was loaded and sealed in an air atmosphere in a hardened steel vial with steel grinding balls of 12.7 mm diameter. The ball to powder charge mass ratio was 40:1. Milling was carried out in a SPEX 8000 mixer/mill for times ranging from 1 to 10 hours. After milling the powder was calcined in air at 500° C. for 1 hour. Removal of the NaCl was carried out by washing the powder with distilled water using an ultrasonic bath and a centrifuge. The washed powder was dried by evaporation in air at 60° C. The resulting $CeO_2$ particle size measured by x-ray diffraction, transmission electron microscopy (TTM) and BET surface area were in the range of 10 to 30 nm. FIG. 1 shows typical nano particles in a sample milled for 6 hours.

In a second experiment a 1 liter attrition mill was used for milling the mixture of $Ce(OH)_4$ and NaCl instead of the SPEX mill. The starting mixture contained 28.4 wt % $Ce(OH)_4$ and NaCl, corresponding to $Ce(OH)_4$+9 NaCl, was loaded and sealed in an argon atmosphere in the attrition mill with Zirconia grinding balls of 2.5 mm diameter. The ball to powder charge mass ratio was 20:1. Milling was carried out for 0.5 hours. After milling the powder was calcined in air for 1 hour at 500° C. Removal of the NaCl was carried out by washing the powder with distilled water using an ultrasonic bath and a centrifuge and the washed powder was dried by evaporation in air at 60° C.

Figure 2:
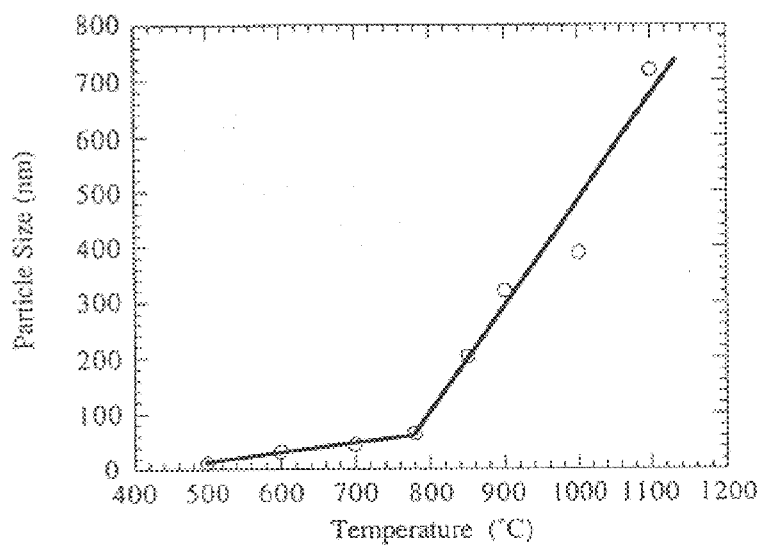
FIG. 2 is a graphical representation of the effect of calcining temperature on the effective particle size of $CeO_2$ powder.

FIG. 2 shows the effect of calcining temperature on the effective particle size of the $CeO_2$ powder calculated from BET surface area measurements assuming spherical particles. A change of slope of the particle size versus temperature curve occurs at the melting temperature of the NaCl diluent. As shown in FIG. 2, a wide range of particle sizes, from less than 20 nm to over 400 nm, were obtained by choosing the appropriate calcining temperature.

EXAMPLE 2

$SnO_2$ from $SnCl_2$

Figure 3:
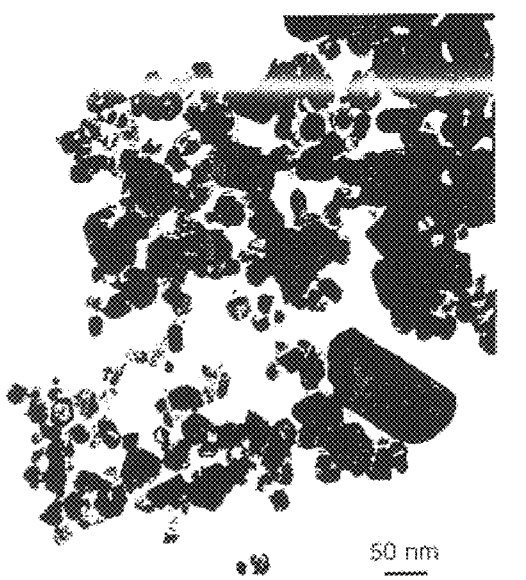
FIG. 3 is a TEM micrograph of $SnO_2$ nanoparticles formed in a sample milled for three hours and calcined at 800° C.

The materials used were $SnCl_2$ (>99%) and NaCl (99.5%). The starting mixture of $SnCl_2$ and NaCl powders with a volume ratio of 1:10, and a total mass of 5 g, was loaded into a SPEX mixer/mill with 50 g of steel grinding media of 6.4 mm diameter, in an argon atmosphere. The ball to powder mass ratio was 10:1. Milling was carried out for three hours. After milling, the powder was annealed at 800° C. in an air atmosphere for 30 minutes to oxidise the $SnCl_2$. Removal of the NaCl diluent was carried out by washing the annealed powder with distilled water. The washed powder was dried in an oven at 60° C. Separated, equiaxed nanoparticles of $SnO_2$ were obtained. The particles were 20–200 nm in size and possessed many surface facets. FIG. 3 shows a transmission electron micrograph (TEM) of the $SnO_2$ particles formed after heat treatment.

EXAMPLE 3

$Al_2O_3$ from $Al(OH)_3$

The materials used were $Al(OH)_3$ (−100 mesh) and NaCl (>99.5%, ≦500 μm) The starting mixture of $Al(OH)_3$ and NaCl powder containing 9 wt % $Al(OH)_3$, corresponding to 10 vol % $Al(OH)_3$, was loaded and sealed in a nitrogen atmosphere in a 7 liter attrition mill containing 25 kg grams of 6 mm diameter stainless steel grinding balls. The ball to powder charge mass ratio was 22.1. The milling time was 2 hours. After milling the powder was calcined in air at 850° C. for 1 hour. Removal of the NaCl was carried out by washing the powder with deionised water using an ultrasonic bath and a centrifuge. The washed powder was dried by evaporation in air at 60° C. X-ray diffraction measurements showed that gamma alumina was formed during the heat treatment by dehydration of the $Al(OH)_3$. The resulting $Al_2O_3$ particle size determined from BET surface area measurements was 11 nm.

EXAMPLE 4

$ZrO_2$ from $ZrOCl_2$

The materials used were $ZrOCl_2 \cdot nH_2O$ and NaCl (>99.5%, <500 μm). The as-received $ZrOCl_2 \cdot nH_2O$ was dried in a vacuum to remove the attached $H_2O$. The starting mixture of 10 grams of $ZrOCl_2$ and 115 grams of NaCl powder, corresponding to 10 vol % $ZrO_2$, was loaded and sealed in an argon atmosphere in a 1 liter attrition mill containing 2.5 kg grams of 2.5 mm diameter Zirconia grinding balls. Milling was carried out for one hour. After milling, the powder was calcined in air at 500° C. for 1 hour to decompose the $ZrOCl_2$ into $ZrO_2$. Removal of the NaCl was carried out by washing the powder with deionised water using an ultrasonic bath and a centrifuge. The washed powder was dried by evaporation in air at 60° C. X-ray diffraction measurements showed that tetragonal or cubic grains were formed during calcining. The resulting $ZrO_2$ particle size determined from x-ray diffraction, transmission electron microscopy and BET surface area measurements was 10 nm.

EXAMPLE 5
ZnO from $ZnCO_3 \cdot 2Zn(OH)_2$

The materials used were $ZnCO_3 \cdot 2Zn(OH)_2$ and NaCl powder, with a starting mixture containing 14.4 wt % $ZnCO_3 \cdot 2Zn(OH)_2$ corresponding to 10 vol % ZnO, which was loaded and sealed in an air atmosphere in a hardened steel vial with steel grinding balls of 4.8 mm diameter. The ball to powder charge mass ratio was 10:1. Milling was carried out in a SPEX 8000 mixer/mill for 3 hours. After milling the powder was calcined in air at 300° C. for 1 hour. Removal of the NaCl was carried out by washing the powder with deionised water using an ultrasonic bath and a centrifuge. The washed powder was dried by evaporation in air at 60° C. Transmission electron microscopy examination showed that the powder consisted of separated particles, 5–20 nm in size. The BET surface area measurement was 35.6 $m^2/gram$ which corresponded to an effective particle size of 33 nm. The mean crystallite size from x-ray diffraction measurements was 13 nm.

EXAMPLE 6
Barium Titanate Powder from $BaCO_3$ and $TiO_2$

Figure 5:
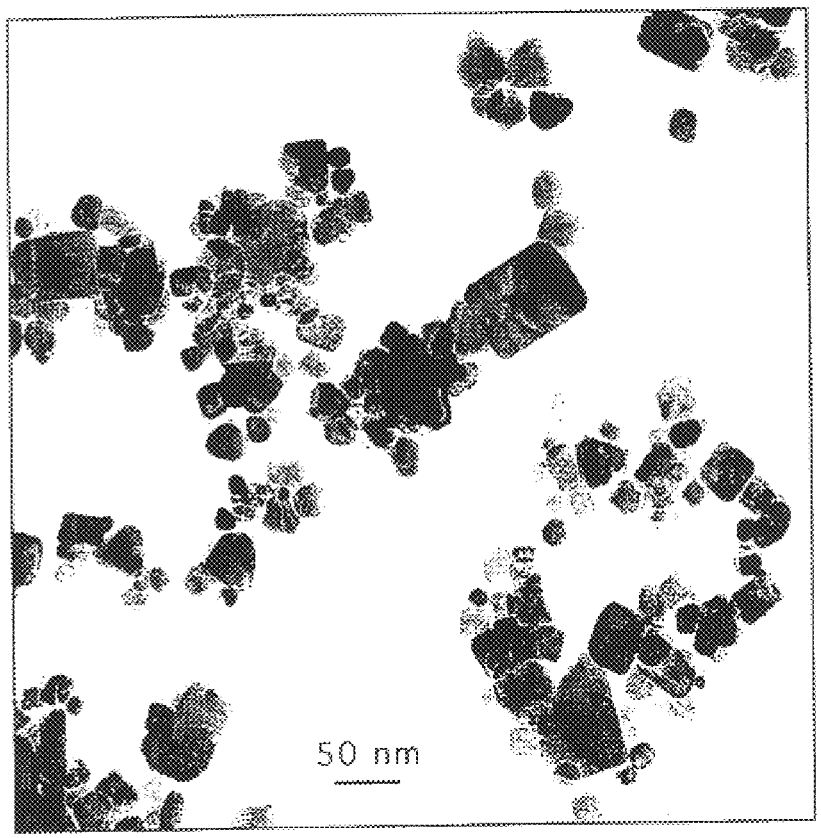
FIG. 5 is a TEM micrograph of $BaTiO_3$ nano particles formed in a sample milled for 2 hours and calcined at 700° C.

The materials used were $BaCO_3$ (−100 mesh), $TiO_2$ and NaCl (≦500 μm). The starting mixture consisting of 1.5 grams of $BaCO_3$, 0.6 grams of $TiO_2$ and 5.9 grams of NaCl powder was loaded and sealed in an air atmosphere in a SPEX mill with hardened steel grinding balls of 9.6 mm in diameter. The ball to powder charge mass ratio was 10. Milling was carried out for two hours. After milling the powder was calcined under an argon atmosphere at 700° C. for 30 minutes. Removal of the NaCl was carried out by washing the powder with distilled water using an ultrasonic bath and a centrifuge. The washed powder was dried by evaporation in air at 60° C. Transmission electron microscopy examination showed that the $BaTiO_3$ powder consisted of separated particles, 60 nm in size. (See FIG. 5).

EXAMPLE 7
$TiO_2$ from $TiOSO_4 \cdot xH_2SO_4 \cdot yH_2O$

The materials used were $TiOSO_4 \cdot xH_2SO_4 yH_2O$ (>99%) and NaCl (99.5%). The starting mixture of $TiOSO_4 \cdot xH_2SO_4 \cdot yH_2O$ and NaCl powders with a total mass of 5 g, was loaded into a SPEX mixer/mill with 50 g of hardened-steel media of 4.8 mm in diameter, under an argon atmosphere. NaCl and $TiOSO_4 \cdot xH_2SO_4 yH_2O$ were dried at 150° C. for 18 hours and 350° C. for one hour, respectively, in an air atmosphere prior to use. The ball to powder mass ratio was 10:1 . Milling was carried out for three hours. After milling, the powder was annealed at 700° C. in an air atmosphere for 30 minutes to form $TiO_2$. Removal of the NaCl diluent was carried out by washing the annealed powder with distilled water. The washed powder was dried in an oven at 60° C.

X-ray diffraction measurements showed that anatase-type $TiO_2$ was formed during heat treatment by thermal decomposition of $TiOSO_4 \cdot xH_2SO_4 \cdot yH_2O$. The starting mixture with a weight ratio between $TiOSO_4 \cdot xH_2SO_4 \cdot yH_2O$ and NaCl of 1:1.5 resulted in separated, equiaxed nanoparticles of $TiO_2$ with sizes of 30–150 nm. The BET surface area was 14.4 $m^2/g$.

Figure 4:
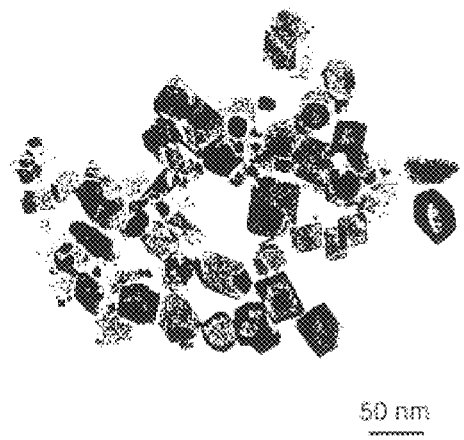
FIG. 4 is a TEM micrograph of $TiO_2$ nanoparticles formed in a sample milled for three hourse and calcined at 700° C.

Changing the starting mixture to a weight ratio between $TiOSO_4 \cdot xH_2SO_4 \cdot yH_2O$ and NaCl of 1:9 resulted in separated, equiaxed nanoparticles of $TiO_2$ with sizes of 10–80 nm (FIG. 4). BET surface area was 25.2 $m^2/g$ which corresponds to a mean particle size of 61 nm. FIG. 4 shows a transmission electron micrograph of $TiO_2$ particles formed after annealing.

EXAMPLE 8
$CeO_2$ from $Ce(OH)_4$

The materials used were $Ce(OH)_4$ (>99%) and NaCl (99.5%). Prior to milling the NaCl was dried at 120° C. for 24 hours and the $Ce(OH)_4$ was calcined at 550° C. for 0.5 hours to form $Ceo_2$. The starting mixture of $CeO_2$ and NaCl powders with a volume ratio of 1:10, and the total mass of 2.4 g, was loaded into a SPEX mixer/mill with 96 g of steel grinding media of 12.7 mm in diameter. The ball to powder mass ratio was 40:1. Milling was carried out for six hours. Removal of the NaCl diluent was carried out by washing the annealed powder with distilled water. The washed powder was dried in an oven at 60° C. Separated, equiaxed nanoparticles of $CeO_2$ were obtained. The particles were 3–20 nm in size and the surface area measured by BET analysis was 53.9 $m^2/g$ corresponding to a particle size of 15.6 nm.

The process for the production of ultrafine powders using mechanical activation as described above, has a number of advantages over conventional processing methods including:

(i) The process is essentially a low temperature process and therefore does not require the complex control systems associated with some chemical and physical production methods.

(ii) The process enables a significant degree of control over the particle size and size distribution of the particles in the ultrafine powder by controlling the parameters of mechanical activation and heat treatment.

(iii) The process allows the use of lower cost starting materials. Metal compounds used as precursors or formed at intermediate stages in conventional separation and purification processes may be suitable.

(iv) The process is relatively inexpensive and has a high yield rate, so that it can be readily modified for the synthesis of ultrafine particles on a commercial scale.

It will be apparent to persons skilled in the materials and chemical engineering arts that numerous enhancements and modifications can be made to the above described process without departing from the basic inventive concepts. For example, in some applications the precursor metal compound may have been pretreated and is supplied to the process in the form of the desired metal oxide phase. All such modifications and enhancements are considered to be within the scope of the present invention, the nature of which is to be determined from the foregoing description and the appended claims. Furthermore, the preceding examples are provided for illustrative purposes only, and are not intended to limit the scope of the process of the invention.

The claims defining the invention are as follows:

1. A process for the production of ultrafine powders, the process comprising:
    subjecting a mixture of a precursor metal compound and a non-reactant diluent phase to mechanical milling which through the process of mechanical activation reduces the microstructure of the mixture to the form of nano-sized grains of the metal compound uniformly dispersed in the diluent phase;
    heat treating the mixture of nano-sized grains of the metal compound uniformly dispersed in the diluent phase to convert the nano-sized grains of the metal compound into a metal oxide phase; and removing the diluent phase such that said nano-sized grains of the metal oxide phase are left behind in the form of an ultrafine powder.

2. A process for the production of ultrafine powders as defined in claim 1 wherein said ultrafine powder includes powder particles in the size range of 1 nm to 200 nm.

3. A process for the production of ultrafine powders as defined in claim 2, wherein said ultrafine powder includes powder particles in the size range of 1 nm to 50 nm.

4. A process for the production of ultrafine powders as defined in claim 2, wherein said heat treating is performed at sufficiently low temperatures to minimize the occurrence of grain growth of the metal oxide phase and thereby control particle size.

5. A process for the production of ultrafine powders as defined in claim 4, wherein the heat treating is performed by calcining at temperatures within the range of 300° C. to 850° C. to control particle size.

6. A process for the production of ultrafine powders as defined in claim 2, wherein the precursor metal compound is selected to be of sufficiently low hardness to ensure that deformation and fracture of the particles occurs during mechanical milling so as to form a nanocomposite structure consisting of isolated nano-sized grains of the metals compound embedded in the diluent phase.

7. A process for the production of ultrafine powders as defined in claim 6, wherein the precursor metal compound is selected to have a hardness within the range of 1 to 5 on the Mohs hardness scale.

8. A process for the production of ultrafine powders as defined in claim 7, wherein the metal compound is a hydroxide, carbonate sulphate, oxychloride or other compound which decomposes on heating in air to form an oxide of the metal and the diluent is a salt which does not react with the metal compound, which does not readily vaporize during heating and which is readily dissolved in a solvent.

9. A process for the production of ultrafine powders as defined in claim 8, wherein the precursor metal compound is selected from the group consisting of $Ce(OH)_4$, $ZrOCl_2$, $Ce_2(CO_3)_3$, $Al(OH)_3$, $BaCO_3$, $TiO_2$, $ZnCO_3 \cdot 2Zn(OH)_2$, $SnCl_2$, $Al_2(SO_4)_3$, and $TiOSO_4$.

10. A process for the production of ultrafine powders as defined in claim 2, wherein the diluent phase is added in a sufficient amount relative to the precursor metal compound so that the volume fraction of the diluent is high enough for the nano-sized grains of the metal compound to develop during milling as fully separated grains embedded in the diluent phase.

11. A process for the production of ultrafine powders as defined in claim 10, wherein the volume fraction of the diluent phase exceeds 80% to ensure fully separated nano-size grains.

12. A process for the production of ultrafine powders as defined in claim 11, wherein the diluent phase is selected from the group consisting of NaCl, $CaCl_2$, $MgCl_2$, $Na_2SO_4$, $Na_2CO_3$, $Ca(OH)_2$, CaO and MgO.

13. A process for the production of ultrafine powders as defined in claim 6, wherein said removing the diluent phase involves subjecting the nanocomposite structure to a solvent which selectively removes the diluent phase, while not reacting with the metal oxide phase.

14. A process for the production of ultrafine powders as defined in claim 13, wherein the diluent phase is NaCl and the solvent is distilled water.

15. A process for the production of ultrafine powders as defined in claim 2, wherein the precursor metal compound is a metal oxide phase which has mechanical properties to form nano-sized grains of the metal oxide phase during milling with the diluent phase.

16. A process for the production of ultrafine powders as defined in claim 2, wherein the precursor metal compound is one of a plurality of precursor metal compounds which when milled with the diluent phase forms a nanocomposite structure consisting of separated nanoparticles of the metal compound embedded in the diluent phase.

* * * * *

UNITED STATES PATENT AND TRADEMARK OFFICE
CERTIFICATE OF CORRECTION

PATENT NO.    : 6,503,475 B1                                              Page 1 of 1
DATED         : January 7, 2003
INVENTOR(S)   : Paul Gerard McCormick and Takuya Tsuzuki It is certified that error appears in the above-identified patent and that said Letters Patent is hereby corrected as shown below:

<u>Title page,</u>
Item [75], Inventors, 2nd Inventor should be -- Takuya Tsuzuki --.

Signed and Sealed this

Fifteenth Day of July, 2003

JAMES E. ROGAN
*Director of the United States Patent and Trademark Office*